Nov. 13, 1928.

W. F. DEHUFF

MIXING MACHINE

Filed June 10, 1927

W. F. Dehuff
INVENTOR

BY Victor J. Evans
ATTORNEY

Nov. 13, 1928.
W. F. DEHUFF
MIXING MACHINE
Filed June 10, 1927
1,691,843
2 Sheets-Sheet 2
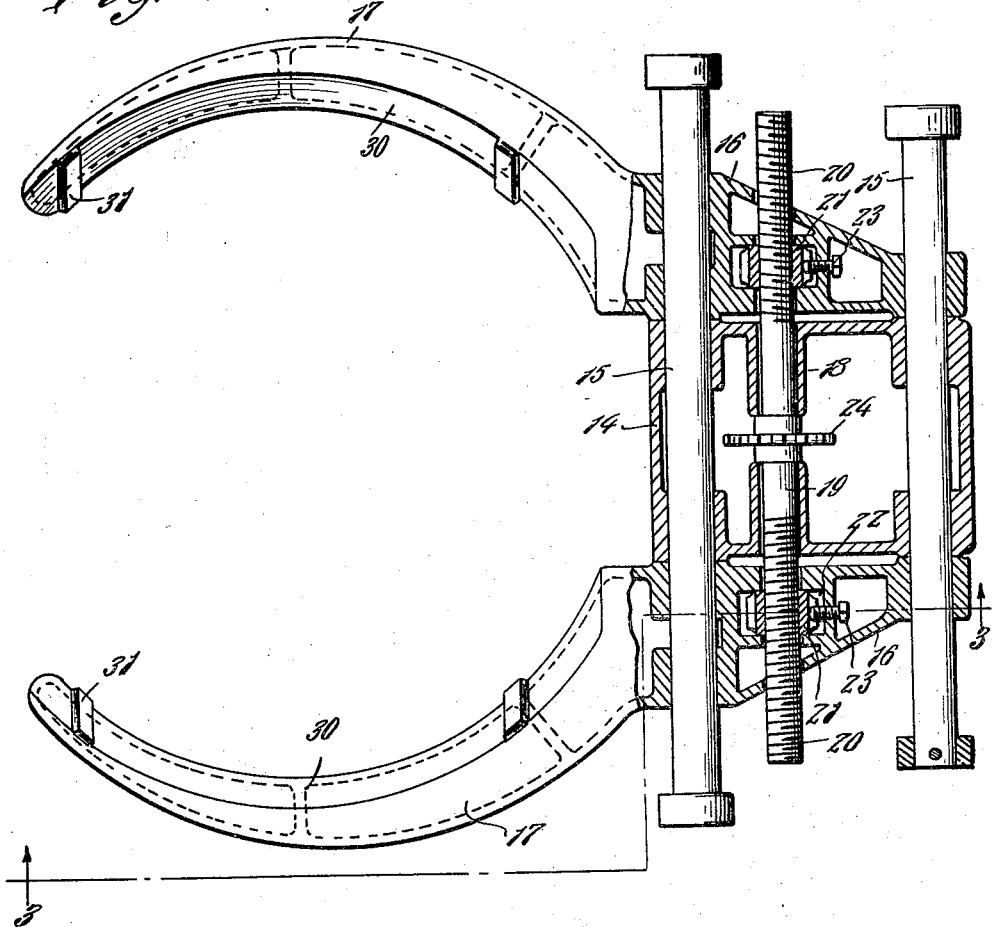
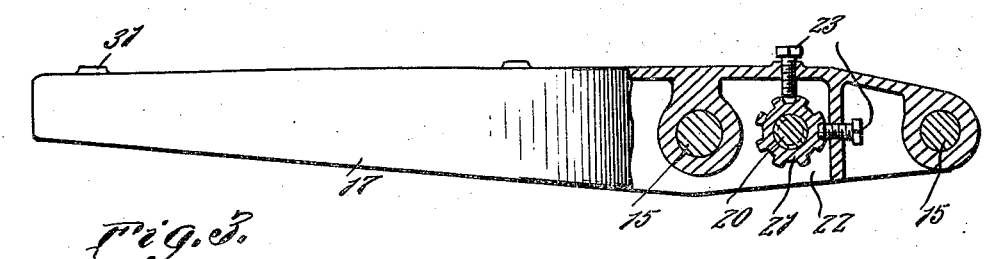
W. F. Dehuff
INVENTOR
BY Victor J. Evans
ATTORNEY Patented Nov. 13, 1928.

1,691,843

UNITED STATES PATENT OFFICE.

WALTER F. DEHUFF, OF GLEN ROCK, PENNSYLVANIA.

MIXING MACHINE.

Application filed June 10, 1927. Serial No. 197,932.

This invention relates to improvements in mixing machines, and has particular relation to means for handling and supporting the bowl of a dough mixing machine.

More specifically stated, the invention provides a pair of saddle arms which are supported by the frame of the mixing machine and are movable with respect to one another to engage and release the bowl, the manner of engagement acting to lift and center or properly position the bowl to receive the mixing mechanism, while the releasing action lowers the bowl, so that a heavy bowl may be handled by a single workman.

With the above and other objects in view, the invention further includes the following novel features and details of construction, to be hereinafter more fully described, illustrated in the accompanying drawings and pointed out in the appended claims.

In the drawings:—

Figure 2 is a horizontal sectional view with the bowl removed and the saddle arms shown in top plan view.

Figure 3 is a sectional view taken substantially on the line 3—3 of Figure 2.

Figure 1:
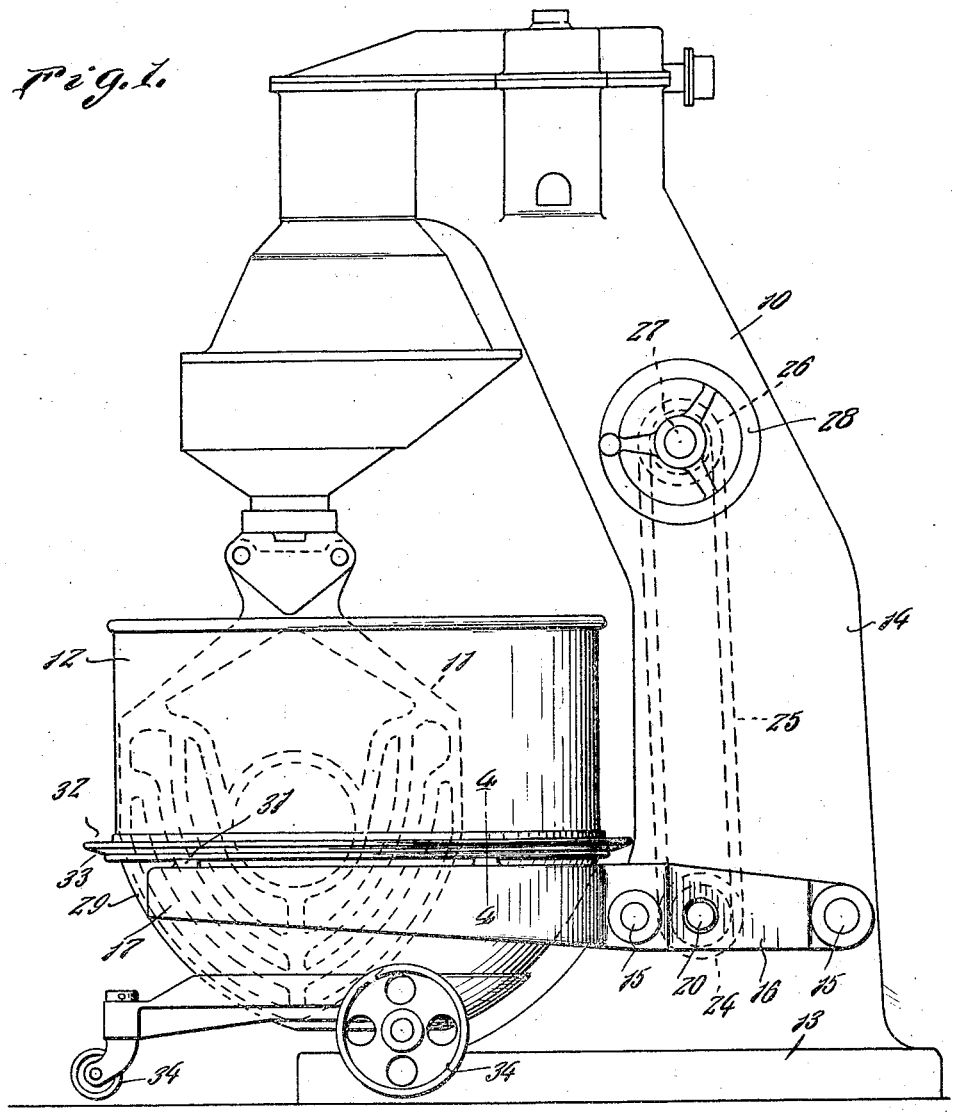
Figure 1 is a side elevation illustrating the invention.
Figure 4:
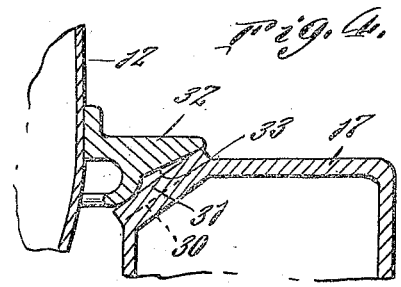
Figure 4 is an enlarged fragmentary section on the line 4—4 of Figure 1 but showing one of the saddle arms engaging the bowl rim.

Referring to the drawings in detail wherein like characters of reference denote corresponding parts, the reference character 10 indicates the frame of a mixing machine which supports a mixing device or beater 11, the latter being designed to enter a bowl 12 to agitate and mix the contents of the bowl. Any suitable type of mixing machine may be utilized, the invention being illustrated in connection with a dough mixing machine. The mixing machine 10 includes a base 13 from which rises a pedestal or standard 14, the latter being shown in the form of a hollow column.

Fixed within this column are spaced parallel guide bars 15 which are preferably circular in cross section and which extend for an appreciable distance beyond the opposite sides of the standard 14. Slidingly mounted upon the projecting ends of the bars 15 are the inner ends 16 of a pair of saddle arms, the outer ends of the latter being oppositely curved as shown at 17. The saddle arms are thus mounted for horizontal sliding movement and are guided in this movement upon the bars 15.

Rotatably mounted in suitable bearings 18 located within the standard 14 is a shaft 19 and the opposite ends of this shaft are reversely threaded as shown at 20. The threaded ends of the shaft 19 are engaged by nuts 21 which are located within openings 22 provided upon the inner ends 16 of the saddle arms. These nuts are held against rotation by means of set screws 23, and may be removed if desired.

The shaft 18 has secured thereon a sprocket wheel 24, while a sprocket chain 25 passes over this wheel and over a sprocket wheel 26 which is mounted upon a shaft 27. A hand or operating wheel 28 is fast upon the shaft 27.

It will be seen from the foregoing that the shaft 19 may be rotated through the medium of the wheel 28 and when rotated in one direction, will move the saddle arms outward and when rotated in an opposite direction, the saddle arms will be moved inward.

The bowl 12 is provided with a substantially semi-spherical bottom 29 and the inner faces 30 of the saddle arms are curved and beveled in conformity with the shape of this bottom. The inner faces 20 of the saddle arms are also provided with spaced pads or extensions 31.

The bowl 12 has secured thereto an annular member or saddle ring 32 which is provided with an inclined under face 33.

When it is desired to position the bowl, the saddle arms are moved relatively outward and the bowl which is supported upon wheels 34, is rolled into position beneath the elevated beater 11. The hand wheel 28 is then rotated to move the saddle arms relatively inward, the pads 31 first engaging the under inclined face 33 of the saddle ring 32. Continued inward movement of the saddle arms will cause the ring 32 to ride upward along the pads 31 until the ring passes above the saddle arms and the pads engage the semi-spherical bottom of the bowl. This engagement between the saddle arms and bowl accurately positions or centers the bowl so as to properly receive the beater 11, and the latter is then lowered into position and operated to mix the contents of the bowl. After the mixing operation the hand wheel 28 is rotated in an opposite direction so that the saddle arms will move relatively outward and the bowl will be lowered so that its wheels 34 may engage the floor. The saddle arms are moved outward a sufficient distance to permit the bowl to pass outward between the outer free ends of the arms. By means of the construction described, a heavy bowl may be handled by a single operator with a minimum amount of labor and in a relatively short time.

The invention is susceptible of various changes in its form, proportions and minor details of construction and the right is herein reserved to make such changes as properly fall within the scope of the appended claims.

Having described the invention what is claimed is:—

1. In a mixing machine, a frame, relatively movable saddle arms carried by the frame, a mixing bowl adapted to be supported by said arms, means to move the saddle arms relatively inward and outward to engage or release the bowl and interengaging means on said arms and bowl, whereby inward movement of the arms will position the bowl to receive the mixing mechanism of the mixing machine.

2. In a mixing machine, a frame, relatively movable saddle arms carried by the frame, a mixing bowl adapted to be supported by said arms, means to move the saddle arms relatively inward and outward to engage or release the bowl and interengaging means on said arms and bowl whereby engagement of the saddle arms with the bowl will elevate said bowl, and position the same to receive the mixing mechanism of the mixing machine.

3. In a mixing machine, a frame, relatively movable saddle arms carried by the frame, a mixing bowl adapted to be supported by said arms, means to slide the saddle arms relatively inward and outward to engage and raise the bowl and interengaging means on said arms and bowl to effect horizontal movement of said bowl and position the latter to receive the mixing mechanism of the mixing chamber when the bowl is elevated.

4. In a mixing machine, a frame, relatively movable saddle arms carried by the frame, a mixing bowl adapted to be supported by said arms, means to move the saddle arms relatively inward and outward, an inclined bottom for the bowl and means carried by the arms for engagement with the inclined bottom when said arms are moved inward, to position the bowl to receive the mixing mechanism of the mixing machine.

5. In a mixing machine, a frame, relatively movable saddle arms carried by the frame, a mixing bowl adapted to be supported by said arms, means to move the saddle arms relatively inward and outward, an inclined bottom for the bowl and means carried by the arms for engagement with the inclined bottom when said arms are moved inward to raise and position the bowl to receive the mixing mechanism of the mixing machine.

6. In a mixing machine, a frame, relatively movable saddle arms carried by the frame, a mixing bowl adapted to be supported by said arms, means to mount the arms for horizontal sliding movement to move said arms relatively inward and outward and engage and release the bowl and means to actuate said arms.

7. In a mixing machine, a frame, relatively movable saddle arms carried by the frame, a mixing bowl adapted to be supported by said arms, slide rods carried by and extending beyond opposite sides of the frame of the machine to support the arms for horizontal sliding movement and engage and release the bowl and means to actuate the arms.

8. In a mixing machine, a frame, relatively movable saddle arms carried by the frame, a mixing bowl adapted to be supported by said arms, means to mount the arms for horizontal sliding movement to move said arms relatively inward and outward and engage and release the bowl and means to simultaneously move the arms in opposite directions.

9. In a mixing machine, a frame, relatively movable saddle arms carried by the frame, a mixing bowl adapted to be supported by said arms, means to mount the arms for horizontal sliding movement to move said arms relatively inward and outward and engage and release the bowl, a right and left threaded shaft rotatable within the frame of the machine and operatively associated with the arms to actuate the latter when the shaft is rotated and means to rotate the shaft.

10. In a mixing machine, a frame, relatively movable saddle arms carried by the frame, a mixing bowl adapted to be supported by said arms, means to move the saddle arms relatively inward and outward, a transversely inclined annular flange surrounding the bowl and means carried by the arms for engagement with the flange when said arms are moved inward to position the bowl to receive the mixing mechanism of the mixing machine.

11. In a mixing machine, arms movably supported by the frame, a mixing bowl adapted to be supported by said arms, means to move the arms, and interengaging means between the bowl and arms, whereby movement of said arms will move the bowl with respect to the arms and position said bowl to receive the mixing mechanism of the mixing machine.

In testimony whereof I affix my signature.

WALTER F. DEHUFF.